Figure 1:
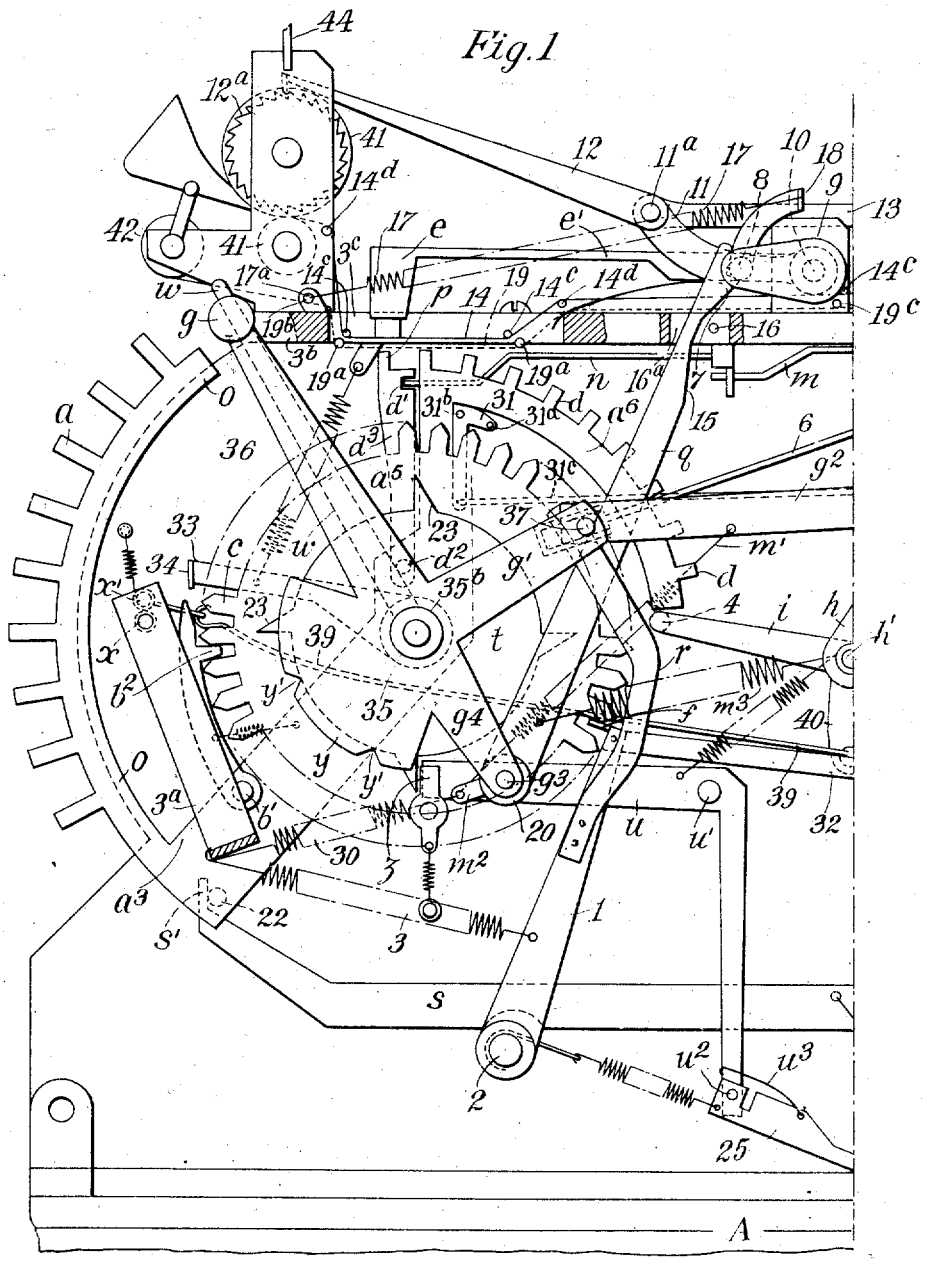

A. R. JENNINGS.

ADDING MACHINE.

APPLICATION FILED MAY 5, 1908.

Reissued July 13, 1909.

12,987.

10 SHEETS—SHEET 1.

Witnesses:
Thomas J. Byrnes
A. S. Dunham

A. R. Jennings, Inventor
By his Attorneys
Kerr, Page & Cooper

A. R. JENNINGS.
ADDING MACHINE.
APPLICATION FILED MAY 5, 1908.
Reissued July 13, 1909.
12,987.
10 SHEETS—SHEET 2.
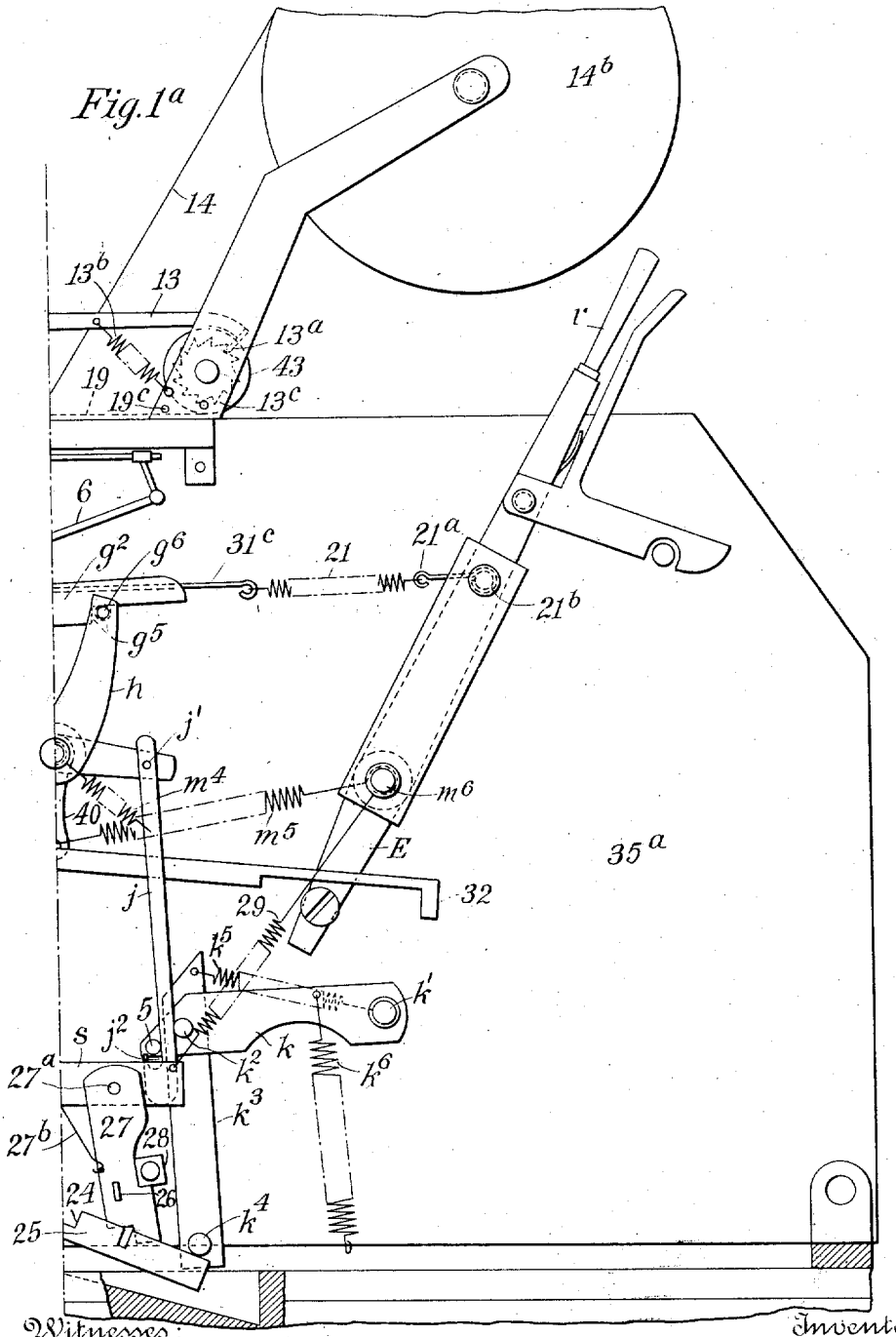
Witnesses:
Thomas J. Byrnes
A. S. Dunham
Inventor
A. R. Jennings
By his Attorneys
Kerr, Page & Cooper

A. R. JENNINGS.

ADDING MACHINE.

APPLICATION FILED MAY 5, 1908.

Reissued July 13, 1909.

12,987.

10 SHEETS—SHEET 3.

Witnesses:

Thomas J. Byrnes

S S Dunham

A.R. Jennings, Inventor.

By his Attorneys

Kerr, Page & Cooper

A. R. JENNINGS.
ADDING MACHINE.
APPLICATION FILED MAY 5, 1908.
Reissued July 13, 1909.
12,987.
10 SHEETS—SHEET 4.
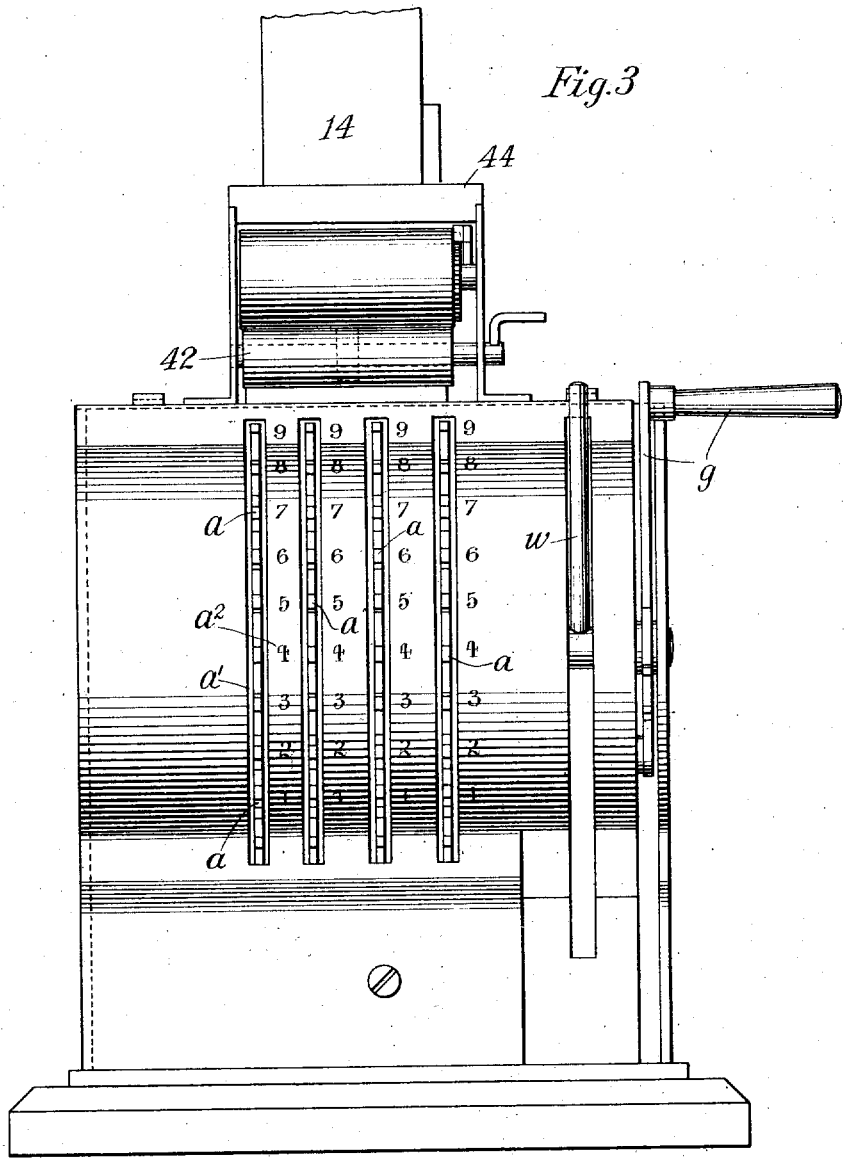
Witnesses:
Thomas J. Byrnes.
S S Dunham
A.R. Jennings, Inventor
By his Attorneys
Kerr, Page & Cooper A. R. JENNINGS.
ADDING MACHINE.
APPLICATION FILED MAY 5, 1908.
Reissued July 13, 1909.
12,987.
10 SHEETS—SHEET 5.
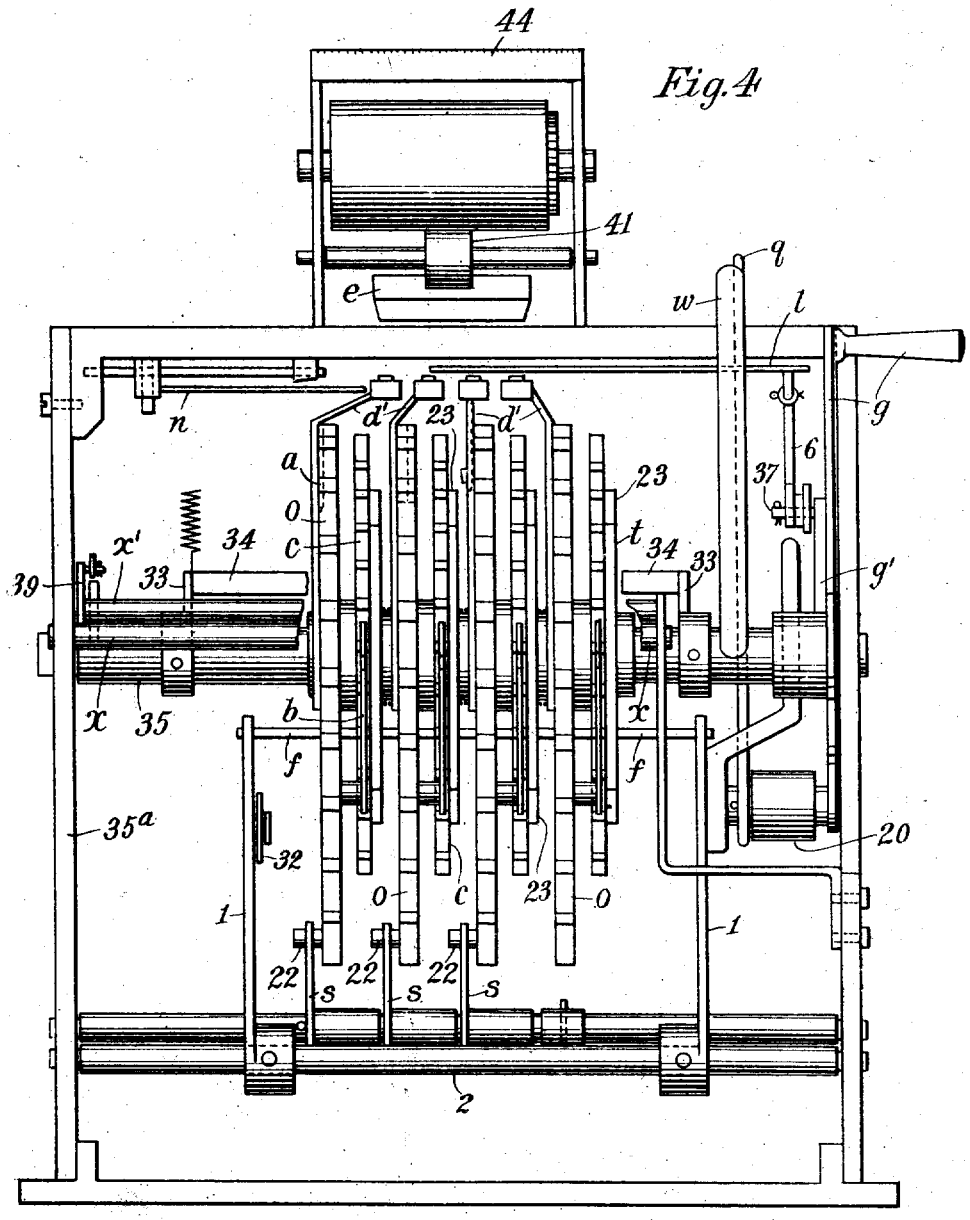
Witnesses:
Thomas J. Byrnes
A. A. Dunham
A. R. Jennings, Inventor
By his Attorneys
Kerr, Page & Cooper

A. R. JENNINGS.

ADDING MACHINE.

APPLICATION FILED MAY 5, 1908.

Reissued July 13, 1909.

12,987.

10 SHEETS—SHEET 6.

Witnesses:

Thomas J. Byrnes

S S Dunham

A. R. Jennings, Inventor

By his Attorneys

Kerr, Page & Cooper

A. R. JENNINGS.

ADDING MACHINE.

APPLICATION FILED MAY 5, 1908.

Reissued July 13, 1909.

12,987.

10 SHEETS—SHEET 7.

Witnesses:
Thomas J. Byrnes
S S Durham

A. R. Jennings, Inventor
By his Attorneys
Kerr, Page & Cooper

A. R. JENNINGS.

ADDING MACHINE.

APPLICATION FILED MAY 5, 1908.

Reissued July 13, 1909.

12,987.

10 SHEETS—SHEET 8.

Witnesses

Thomas J. Byrnes.

A S Dunham

A.R. Jennings, Inventor

By his Attorneys

Kerr, Page & Cooper

A. R. JENNINGS.

ADDING MACHINE.

APPLICATION FILED MAY 5, 1908.

Reissued July 13, 1909.

12,987.

10 SHEETS—SHEET 9.

Witnesses:

Thomas J. Byrnes.

S S Dunham

A.R. Jennings, Inventor

By his Attorneys

Kerr, Page & Cooper

A. R. JENNINGS.

ADDING MACHINE.

APPLICATION FILED MAY 5, 1908.

Reissued July 13, 1909.

12,987.

10 SHEETS—SHEET 10.

Witnesses:
Thomas J. Byrnes.
A S Dunham

A. R. Jennings, Inventor
By his Attorneys
Kerr, Page & Cooper

UNITED STATES PATENT OFFICE.

ANDREW RAWSON JENNINGS, OF LONDON, ENGLAND.

ADDING-MACHINE.

No. 12,987. Specification of Reissued Letters Patent. Reissued July 13, 1909.

Original No. 856,157, dated June 4, 1907, Serial No. 300,512. Application for reissue filed May 5, 1908. Serial No. 431,067.

*To all whom it may concern:*

Be it known that I, ANDREW RAWSON JENNINGS, a citizen of the United States, residing in the city of London, England, have invented certain new and useful Improvements in and Relating to Adding-Machines, and do hereby declare the nature of this invention and in what manner the same is to be performed to be particularly described and ascertained in and by the following statement.

This invention relates to adding machines for use in recording sums of money or the like in columns and for listing the amount of checks, drafts, notes and the like, adding the sum totals, printing the sets of figures in columnar order, and the totals at the foot of the columns.

The invention aims to provide an adding machine for the purpose set forth which shall be simple in its construction, so set up as to avoid the employment of gearing as much as possible, efficient in its use, strong, durable, accurate in its operation, conveniently operated, readily set up, and comparatively inexpensive to manufacture.

With the foregoing and other objects in view, the invention consists in the novel construction, combination and arrangement of parts hereinafter more specifically described and illustrated in the accompanying drawings, wherein is shown the preferred embodiment of the invention, but it is to be understood that changes, variations, and modifications can be resorted to, which come within the scope of the claims hereunto appended.

In describing the invention in detail, reference characters denote corresponding parts through the several views, and in which—

Figure 2:
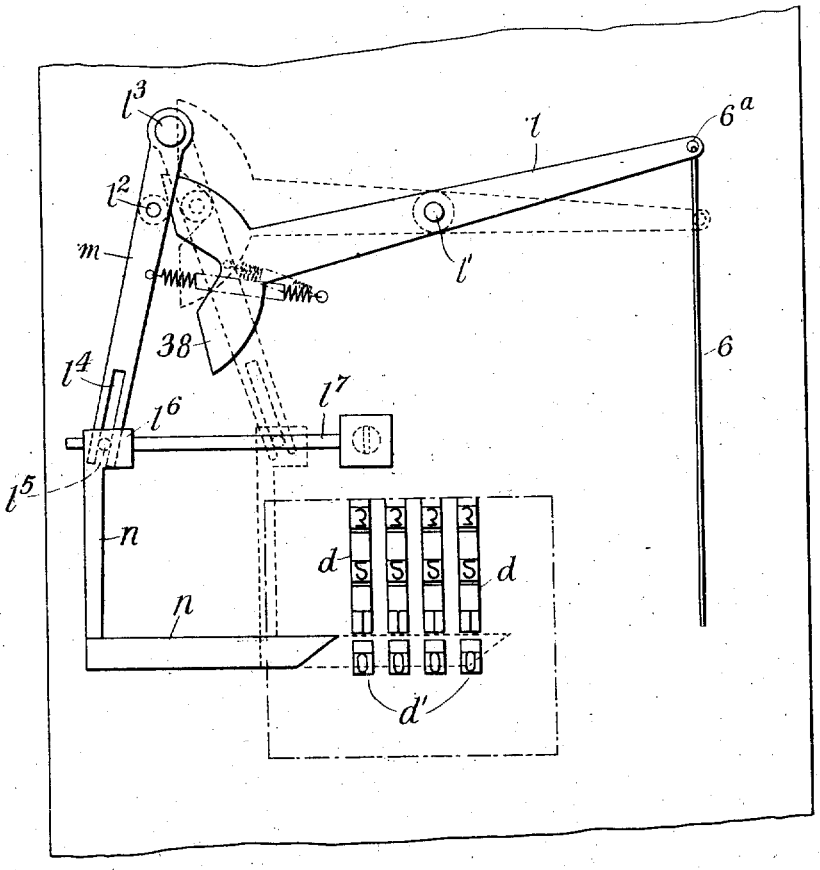
Figure 6:
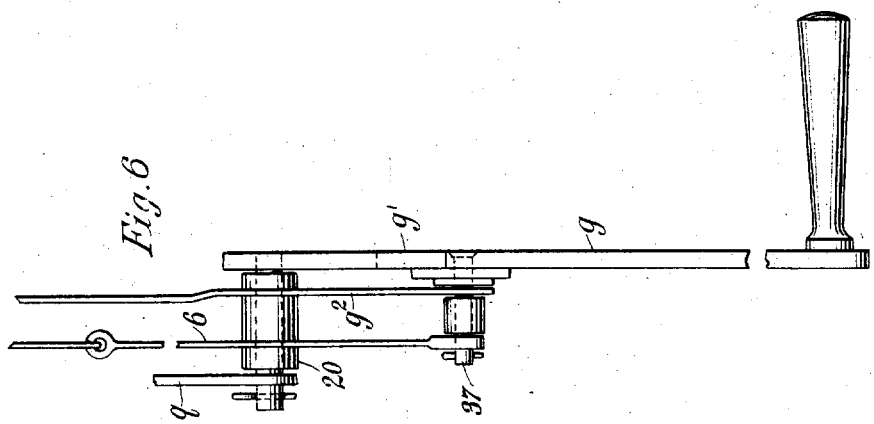
Figure 5:
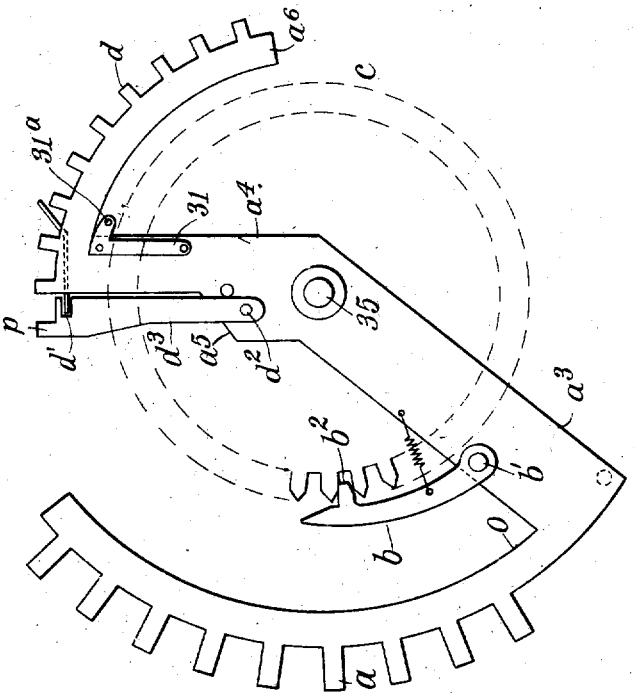
Figure 7:
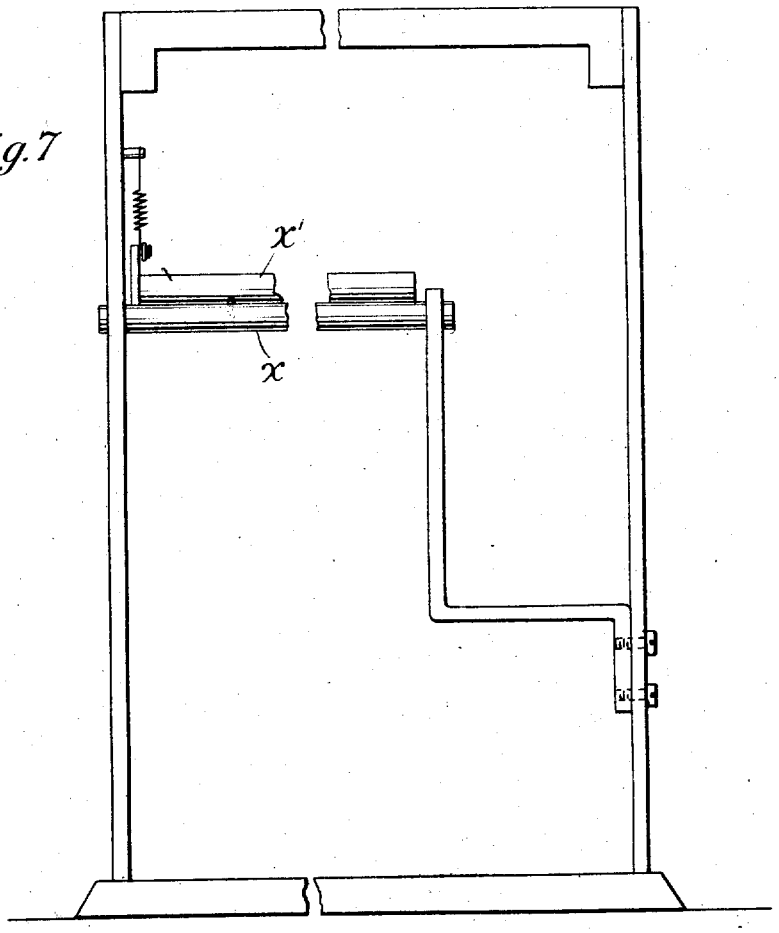
Figure 8:
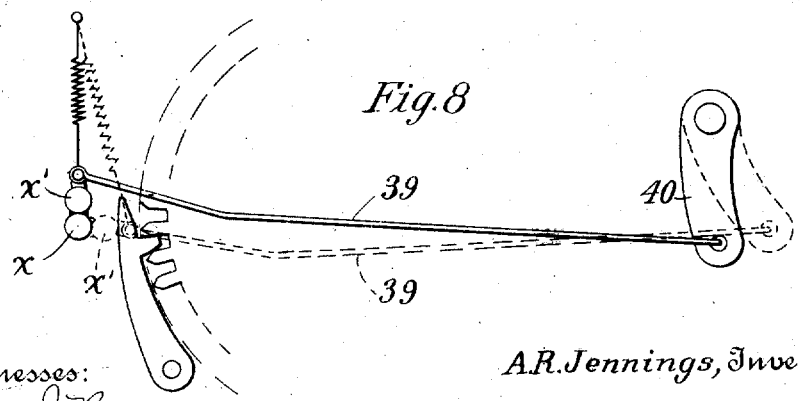
Figure 9:
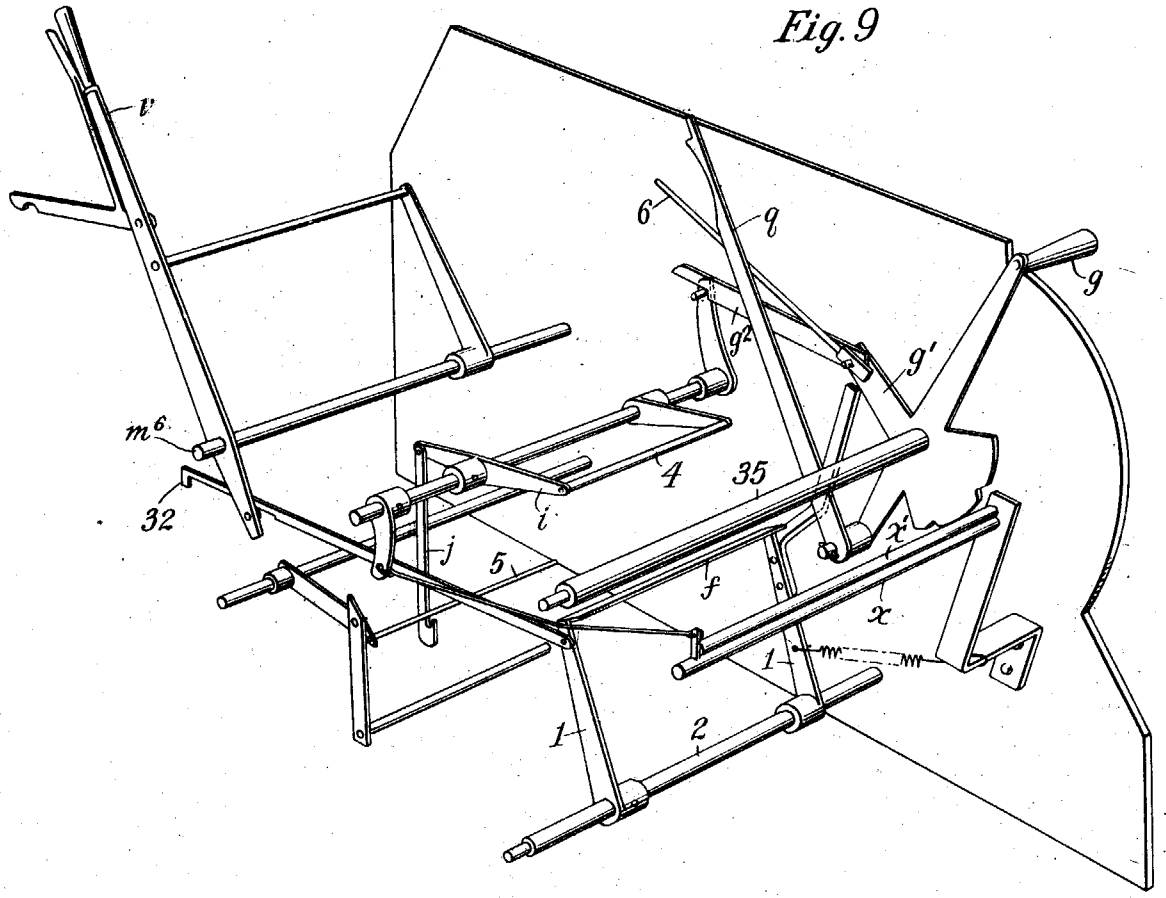
Figure 10:
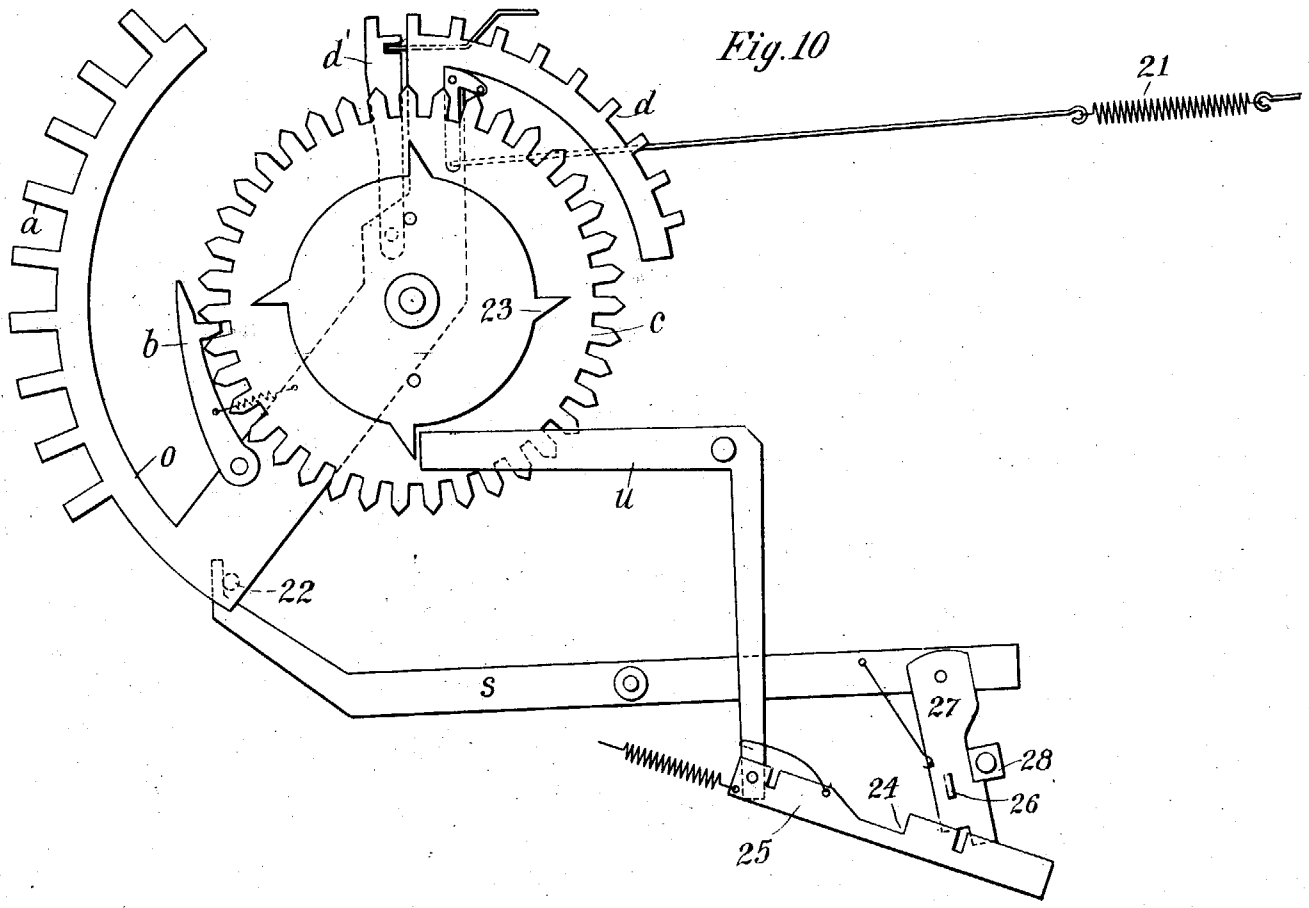
Figure 11:
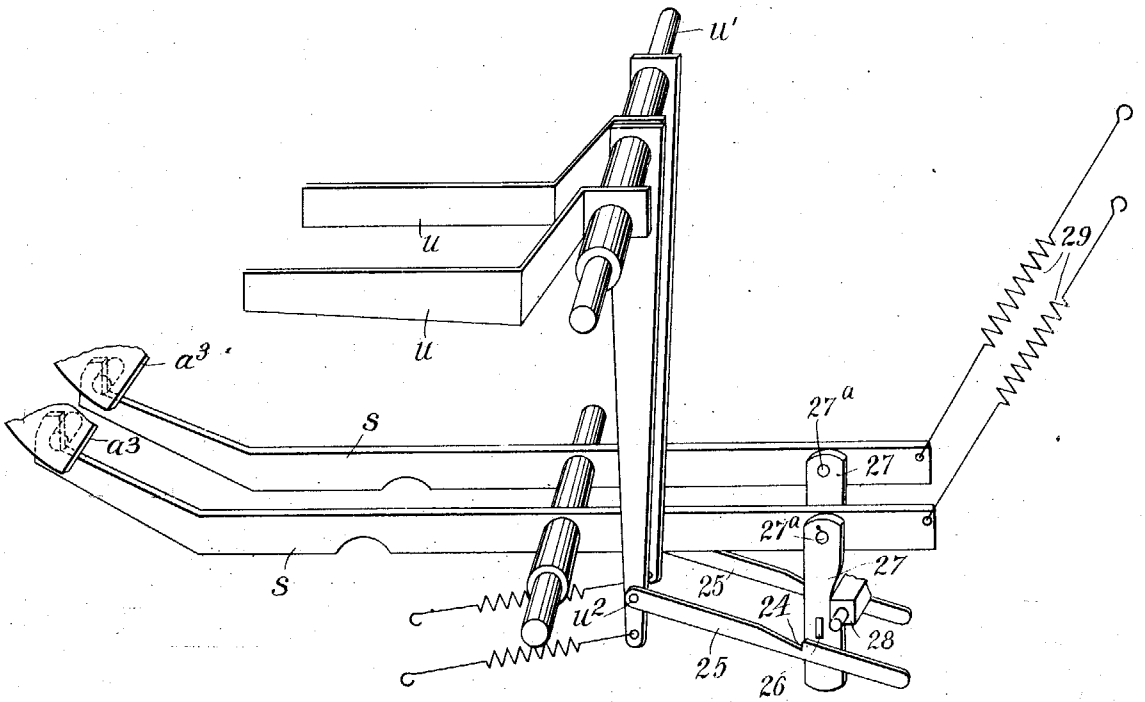

Figure 1 is a side view of the left-hand half of a machine in accordance with this invention partly in section and with the side plate removed so as to enable parts of the machine to be clearly shown. Fig. 1[a] is a view similar to Fig. 1 but showing the right-hand half of the machine. Fig. 2 is a plan view illustrating the cipher moving levers and a portion of the type quadrants. Fig. 3 is a front view of the machine. Fig. 4 is a front view of the machine with the case removed. Fig. 5 is a side elevation showing the type and key quadrants. Figs. 6, 7, and 8 are details. Fig. 9 is a perspective view showing the handle and total key connections. Fig. 10 is a side elevation showing the actual adding and carrying principle, and Fig. 11 is a perspective view showing two of the carrying levers with their connections.

Referring to the drawings by reference characters the machine comprises a horizontally-extending shaft 35 journaled in the sides of the frame $35^a$, and upon the shaft 35 are loosely mounted collars $35^b$, to which are fixed the toothed accumulating wheels $c$. Preferably the number of teeth on each of said wheels is 40, except for pence columns in sterling machines, when the number of teeth would be 48.

In the case of decimal adding machines, it will be found convenient to employ wheels $c$, each having forty teeth. The collars $35^b$ space the wheels $c$ suitable distances apart.

The machine casing is formed in the front thereof with a plurality of slots $a'$, through which project the keys $a$, so as to enable the said keys to be conveniently reached by the operator. At the side of each series of keys and on the front of the machine casing the digits $a^2$ are provided, these digits being from 1 to 9. Each set of keys $a$ is carried by a quadrant $o$, which terminates at its lower end in a connecting bar fixed upon one of the collars $35^b$, and the said connecting bar has its lower portion extending rearwardly and upwardly at an inclination, as at $a^3$, and the connecting bar has its upper portion, as at $a^4$ extending in a vertical manner, and the said upper portion $a^4$ is provided with an off-set $a^5$. The upper portion $a^4$ of the connecting bar terminates in a rearwardly-extending sector shaped arm $a^6$, provided with a series of type $d$ for printing the digits 1 to 9. When a set of keys $a$ is in normal position, the forward edge of said portion of the connecting bar is in alinement with a vertical line through the center of the shaft 35 so that the first one of the type $d$ will be rearwardly of the hammer to be hereinafter referred to. Pivoted to the off-set $a^5$, as at $d^2$, is a vertically-extending type carrying arm $d^3$, provided at its top with a cipher type $p$, and the said arm $d^3$ in that side which opposes the front of the portion $a^4$ is formed with a notch $d'$ to permit of the entrance of a shifting lever in the manner as hereinafter set forth, so as to move the type $p$ from normal position, which is below the hammer to be hereinafter referred to. Each of the connecting bars is adapted to shiftably support its respective quadrant $o$ and sector arm $a^6$ upon the shaft 35, and the said connecting bars constitute means for connecting the type-carrying sector arm with the key-carrying quadrant, so that when the key-carrying quadrant is shifted downwardly, the type-carrying sector arm will move forwardly, and the arm $d^3$ will also have a corresponding movement to the type-carrying sector.

To prevent back movement of each of the quadrants $o$, each of the connecting bars is provided with a pawl $b$, pivoted as at $b'$, to the bar and provided with a nose $b^2$, which is adapted to extend between the pair of teeth of that accumulating wheel $c$ which associates with a quadrant $o$ and its connecting bar, there being a wheel $c$ for each quadrant $o$. The pawls $b$ are constructed in such a manner that they will travel over the teeth of the wheels $c$ when the quadrants are moved downwardly, the wheels $c$ being held stationary owing to a locking device engaging between the teeth thereof. The locking device consists of a horizontally-extending bar $f$, carried at the upper end of a pair of arms 1, which are pivoted at their lower end to the shaft 2. The bar $f$ is retained in normal engagement between the teeth of the wheels $c$ by means of a spring 3, connected at one end to one of the arms 1, and at the other end to the support $3^a$. The manner in which the bar $f$ is moved from engagement between the teeth of the accumulating wheels $c$ will presently be referred to.

The top $3^b$ of the machine casing, forwardly thereof, is formed with an opening $3^c$ to permit of the operation of a hammer $e$ to make a record upon a recording strip of paper 14, the said strip unwinding off the roll $14^b$, passing under and over the guides $14^c$, $14^d$, and between the friction rollers 41, the strip of paper 14 being positioned by the guides $14^c$ within the opening $3^c$ below the hammer $e$. Arranged below the strip of paper 14 and retained in the opening $3^c$ through the medium of the guides $19^a$ is an ink ribbon, which travels between the guides $19^b$ and off of the roller 42. The ribbon 19 also travels under the guides $19^c$ and upon the roll 43.

The hammer $e$ is formed with a rearwardly-extending arm $e'$, which is fixed to the rock shaft 10. Projecting forwardly from the shaft 10 is an arm 9 provided with a pin 8 adapted to be engaged by the upper end of an elevating arm $q$. Extending forwardly from the shaft 10 is a curved arm 11 to which is pivotally connected, as at $11^a$, a forwardly-projecting lever 12, and a rearwardly-projecting lever 13, the forward or free end of the lever 12 engaging the ratchet teeth $12^a$, fixed to the upper of the rolls 41, and the rear or free end of the lever 13 engaging the ratchet teeth $13^a$ connected to the roll 43. The lever 13 has its rear or free end held in normal engagement with the ratchet teeth $13^a$ through the medium of the pulling spring $13^b$, which is connected at one end to the lever 13 and at its other end to one of the supports $13^c$ for the roller 43 and $14^b$. To the arm 9 is fixed a rearward extension 18, and to the upper end of said extension 18 is attached the rear end of a distensible and contractible spring 17, while the other end of said spring 17 is fixed to the lug $17^a$, carried by the top $3^b$ of the machine casing.

From the foregoing construction it is evident that when the arm $q$ is elevated, the arm 9 will also be elevated, owing to the engaging of the arm $q$ with the pin 8. During such movement, the spring 17 will be extended, and when the arm $q$ is moved from engagement with the pin 8 in a manner as hereinafter set forth, the spring 17 will be released, thereby causing the moving of the arm 9 to normal position and the hammer to strike a blow, so as to make an impression; or, in other words, the hammer $e$ will strike the paper 14 on to the ink ribbon 19 resting above the type or types $d$, and thus print the amount. When the arm 9 is elevated, rocking the shaft 10, the arm 11 will also be elevated, consequently rocking the levers 12 and 13 and causing the feed of the paper and the ink ribbon.

The shifting arm $q$ is provided with a lug 7 upon its upper end, which is adapted to engage the pin 8, and, below the lug 7, the said arm $q$ is formed with a cam portion 15, adapted to contact with a lug 16 secured to one wall of an opening $16^a$ in the top $3^b$ of the casing. Through the opening $16^a$ the arm $q$ is adapted to operate. The lower end of the arm $q$ is connected to a horizontally-extending lug $g^3$ carried on the lower end of an extension $g^4$ forming a part of a handle $g$ which is mounted upon one end of the shaft 35, and, between the lower end of the arm $g$ and the end of the extension $g^4$ and upon the lug $g^3$ is mounted a roller 20, which travels in the path of an arm $r$ projecting upwardly from one of the arms 1.

From the foregoing construction it is evident that when the handle $g$ is lowered, the arm $q$ will be elevated and the roller 20 will engage the arm $r$ and shift the arms 1 rearwardly, which will carry the bar $f$ therewith, so that the said bar $f$ will be moved out of engagement between the teeth of the accumulating wheels $c$. When the arm $q$ is elevated through the medium of a handle $g$ in the manner as stated, the lug 7 will engage the pin 8 and rock the shaft 10 owing to the fact that the lug 7 will elevate the arm 9. During the upward movement of the arm $q$ the cam portion 15 will engage the lug 16, and the said arm $q$ will be shifted forwardly, so that the lug 7 on said arm $q$ will be moved out of engagement with the pin 8, thereby releasing the hammer, so a record can be made upon the paper strip.

The handle $g$ is furthermore provided with an extension $g'$ carrying a stud 37 which has the forward end of a longitudinally-movable bar $g^2$ pivotally connected thereto. The rear end of said bar $g^2$ is shouldered, as at $g^5$, and the said rear end of the bar $g^2$ rests upon a horizontally extending support $g^6$ carried at the upper end of a depending arm $k$. The lower end of said arm $k$ has pivotally connected thereto, as at $k'$, a lever $i$, which has its forward end provided with a rod 4. The rear end of the lever $i$ has a vertical lever $j$ connected thereto, as at $j'$, and the lower end of said lever $j$ is substantially hooked shaped, as at $j^2$. Said end $j^2$ is adapted to engage a rod or bar 5 carried on the forward end of a lever $k$ which is pivoted upon the support $k'$ carried by the machine frame. When the handle $g$ is lowered, the extension $g'$ will be carried forwardly, which in turn, will carry the bar $g^2$ forwardly, and allow the upper end of the arm $k$ to also move forwardly, which in turn will permit the lever $i$ and the rod 4 connected thereto to fall. The lowering of the forward end of the lever $i$ will elevate the lever $j$, so that the hooked end $j^2$ of said lever $j$ will engage the bar or rod 5 and lift the forward end of the lever $k$. The latter carries a spindle $k^2$, which extends at right angles and said lever $k$ also carries a vertically extending arm $k^3$ having an angularly-extending spindle $k^4$ adapted to engage the rear end of a trip lever 25, to be hereinafter referred to. A spring connection $k^5$ is arranged between the arm $k^3$ and the support $k'$. A spring connection $k^6$ is provided between the lever $k$ and the bottom of the machine. The spring connections $k^5$ and $k^6$ are adapted to return the elements $k$ and $k^3$ to normal position. A spring connection $m'$ is provided between the bar $g^2$ and the protuberance $m^2$ on the lug $g^3$. This spring connection insures the rear end of the bar $g^2$ resting upon the support $g^6$. A spring connection 30 is provided between the protuberance $m^2$ and a support $3^a$ for moving the handle $g$ to its normal position, which also insures the moving of the parts connected to said handle $g$ to their normal position. A spring connection $m^3$ is provided between the pivot $h'$ and the arm $q$ for retaining the arm $q$ in contact with the pin 8 and lug 16 when occasion requires. A spring connection $m^4$ is provided for retaining the lever $j$ in contact with the bar or rod 5 when occasion so requires, and a spring connection $m^5$ is provided between a depending arm 40 carried by the lever $l$ and a shaft $m^6$ to insure the lowering of the lever $i$.

Connected to the lug 37 is a rearwardly-extending rod 6, which is articulated, as at $6^a$, to a lever $l$, the latter being pivoted at $l'$, and which has a cam end 38 to engage a stud $l^2$ carried by a lever $m$. One end of the lever $m$ is pivoted, as at 13, and the other end is bifurcated, as at $l^4$, and the said bifurcated end $l^4$ straddles a lug $l^5$ carried by one member of an L-shaped arm $n$. The arm $n$ slides along the notches $d'$ in the arms $d^3$ for the purpose of pushing the arms $d^3$ with the cipher types $p$ from under the hammer $e$ when necessary. The arm $n$ travels in a straight line engaging notch by notch in the arms $d^3$ until it comes to a connecting bar which has been actuated. Such actuated connecting bar will then stop or arrest the travel of the arm $n$. A sliding bearing $l^6$ adapted to travel upon the bar $l^7$ is provided for the arm $n$.

Pivotally connected to each of the portions $a^4$ of the connecting bars is an L-shaped lever 31 having a stud $31^a$, and the said lever 31 is pivotally connected, as at $31^b$. The lower end of each of the levers 31 is connected to a rearwardly-extending bar $31^c$, the latter having its rear end attached to a distensible and contractible spring 21, said spring being connected by a hook $21^a$ to a rod $21^b$ carried by a lever $v$. The function of the springs 21 is to return the key quadrants and type sectors to normal position. The return movement of the quadrants, (such movement being had owing to the action of the springs 21) is limited through the medium of a stop arm $s$ having a protuberance $s'$, which is adapted to be positioned in the path of a lug 22 carried by each of the connecting bars.

The rear end of each of the arms $s$ has a spring connection between the same and the shaft $m^6$, said spring connection being indicated by the reference character 29.

The action of the wheels $c$ and the quadrants will go on with each item that is printed until the number of teeth on any of the wheels $c$ passes 9. This it will be necessary for the column or columns in which 9 has been exceeded to carry in the next column to the left as follows from the ordinary rules of addition. This is accomplished by the following assemblage of parts:

Fixed to each of the accumulating wheels $c$ is a "carrying" cam $t$ provided with protuberances 23 in the form of beveled teeth, which are adapted to engage the upper arm of a lever $u$, there being a lever $u$ for each cam $t$. These levers $u$ are in the form of bell cranks with the exception of the lever $u$ in the extreme left column, such lever $u$ being a one-arm lever. Each of the levers $u$ is pivoted upon a supporting bar $u'$. The other arm of each of the levers $u$, which is not engaged by one of the protuberances 23, is connected as at $u^2$, to a trip lever 25, which is adapted to engage and shift a lever arm 27 from under a stop rod 28. A spring connection $u^3$ is arranged between the trip lever 25 and its respective lever $u$. There is a lever 25 and a lever arm 27 for each of the wheels $c$ with the exception of the right-hand wheel. The quadrant working with this wheel is stopped by a contact plate as this quadrant does not require to move an extra tooth for the purpose of carrying, there being no quadrant to the right of it, it being noted that the levers 25 and 27 in any particular column are actuated by the wheel in the column immediately to the right of it. The lever 25 is provided with a shoulder 24 and the lever arm 27 with a pin 26.

The shoulder 24 is adapted to be shifted to one side of and engage the pin 26 so that when the bell crank lever *u* returns to normal position after being depressed the lever 25 will pull the lever arm 27 from under the rod 28. The lever arm 27 depends from and is suitably connected to the stop arm *s*, as at $27^a$ and a spring connection $27^b$ is arranged between the lever arm 27 and its respective stop arm 5.

From the foregoing it follows that when the wheels *c* are at "zero" the back of any one of the protuberances 23 on the carrying cam *t* is just in front of the upper arm of a bell crank lever *u* and as the wheels *c* move around the cams *t* move with them, one of the protuberances in due course then pressing down the lever *u*. The lug 24 on the trip lever 25 then passes to the other side of the pin 26 on the lever 27 belonging to the next quadrant to the left. Directly the wheel has passed beyond nine teeth from "zero" the lever *u* rises up behind the protuberances 23 of the cam *t* and the trip lever 25 pulls the arm 27 from under the rod 28. The right-hand ends of the levers *s* rise under the action of the springs 29. The next quadrant *o* to the left rises up by the action of the spring 21 a distance of one tooth, taking its corresponding wheel with it.

When the operator releases the lever *g* the spring 30, in a state of tension, brings this lever and other parts in connection therewith back to their normal position and any quadrants *o* that may have been advanced an extra tooth by reason of having carried over, are returned to normal by the rod 4. The levers *s* are pressed down by the rod 5 and the lever 27 then passes to its normal position under 28.

To prevent the pawls *b* from being jerked from their position in the teeth of the wheels *c* the quadrants *o* suddenly come to a stop, a bar or rod *x* is provided fitted on its upper part with another bar or rod *x'*, and connected by connections 39, 40 to the shaft on which is fitted the lever *h*. When the handle or lever *g* is actuated the rod *x* moves and the other rod *x'* assumes a horizontal position preventing the pawls *b* from moving from normal position.

A quadrant *y* is fixed to the lever *g* and is provided with notches *y'* into which a spring actuated pawl *z* engages, preventing the lever *g* from returning to its normal position until the full stroke has been performed. Springs are fitted to the various levers to keep them in their normal position.

Although for the sake of illustration I have only shown four quadrants and four sets of complementary parts, these parts will be multiplied according to the number of columns of figures required to be dealt with.

The total is obtained by pulling the lever, *v* forward as far as it will go and then returning it. This action relieves the tension on springs 21, allows the detent 31 to drop into the notch directly under it, thus locking the accumulating wheels *c* to their quadrants *o* and pulls on the pitman 32, thus disengaging the rod *f* from the wheels *c*, the quadrants *o* then drop down, taking the wheels *c* with them; one point 23 on each carrying cam *t* comes into contact with the lever *u*. The rod *f* then returns, relocking the wheels *c* and quadrants *o* in position to which they have dropped the figures falling in line under the hammer *e* constituting the total. By this means the total is practically converted into a first item placed in the machine after it has been cleared and before the handle *g* has been pulled and it may be either printed and carried forward, printed and cleared from machine or cleared from machine without printing.

To print total and carry it forward it is necessary to pull the handle *g* as usual for an item. The total will then be printed and still left in the machine to be added to any subsequent items.

To clear machine the total lever *w* is then pressed down as far as it will go. The arms 33 and rod 34 with the lever *w* are fixed to the shaft 35 and all move together. When the lever *w* is depressed the rod 34 is pressed onto the inclined ridge at the top of the pawls *b* disengaging them from the accumulating wheels *c* and when the lever *w* is allowed to return the quadrants *o* return with it to normal. A spring 36 acting through the arms 33 and shaft 35 keeps the clearing lever in its normal position.

Errors in depressing keys can be corrected before the handle *g* is pulled by depressing the clearing lever *w* as described above. This returns keys without disturbing amount already in machine.

The rod 6 is connected to a stud 37 on the lever *g'*. When the handle or lever *g* is depressed the rod 6 is pulled actuating the cam 38 on the lever *l*. This allows the slotted arm *m* and with it the L-shaped arm *n* to shift toward the right-hand side of the top plate. The arm *n* slides between the cipher levers *d'*, and the quadrants *o* pushing the cipher levers *d'* toward front of the plate and from underneath the hammer *e*.

As shown in the drawings the quadrants *o* are normal and therefore, if handle *g* were pulled all the ciphers *d'* would be shifted and nothing whatever printed.

If any quadrant *o* were pulled forward as in setting up an item when the handle is pulled the lever $n$ would travel, shifting all the ciphers $d'$ to the left of that quadrant $o$ pulled forward, and being prevented by impinging on the side of said quadrant from traveling any farther, leaves the ciphers to the right of said quadrant to be printed.

What I claim is:

1. An adding machine comprising a pair of type quadrants, one of said quadrants embodying a cipher-carrying element, means for moving said quadrants in unison in the same plane for each column of figures, combined with key quadrants connected to the type quadrants.

2. An adding machine comprising a plurality of key quadrants for setting the items, a plurality of type quadrants, means for permanently connecting a type quadrant to a key quadrant, each of said type quadrants, embodying a cipher-carrying element shiftable independently of its quadrant, and means for operating the key and type quadrants.

3. An adding machine comprising a plurality of key quadrants for setting the items, a plurality of type quadrants, said type quadrants arranged in pairs, one of the type quadrants of each pair having a cipher-carrying element shiftable independently of the other quadrant of the pair, means for operating the key and type quadrants, levers for shifting the type quadrants having the cipher-carrying elements, and operating means for said levers.

4. In an adding machine, toothed wheels, a tensioned locking bar and detent for the toothed wheels, and a total lever having a spring connection with said bar and adapted, when swung in one direction, to release the tension upon the bar and when moved in the opposite direction to apply tension to the bar for the purpose set forth.

5. An adding machine comprising a plurality of toothed wheels, pawls associating with said wheels, key quadrants, type quadrants connected to the key quadrants, a bar associating with said wheels for the purpose set forth, a clearing lever and a clearing lever arm.

6. An adding machine comprising an operating handle, a printing mechanism, a connection between the handle and the printing mechanism for operating the lever, a paper-feeding mechanism, connection between the handle and the paper-feeding mechanism for operating the lever, an inking ribbon, mechanism for shifting the ribbon and a connection between said shifting mechanism, and the handle for operating the shifting mechanism.

7. An adding machine comprising the combination with a plurality of type quadrants embodying cipher-carrying elements, of means for shifting said cipher-carrying elements, said means consisting of a sliding arm adapted to be moved in the direction of its length at right angles to the plane of the quadrants for shifting the cipher-carrying elements from normal position with regard to the other type quadrants when the cipher-carrying elements are not required to be printed from.

8. An adding machine comprising the combination with a plurality of type quadrants embodying cipher-carrying elements, of means for shifting said cipher-carrying elements said means consisting of a sliding arm adapted to be moved in the direction of its length at right angles to the plane of the quadrants for shifting the cipher-carrying elements from normal position with regard to the other type quadrants when the cipher-carrying elements are not required to be printed from, a record mechanism embodying an inking ribbon and a recording sheet associated with said quadrants, and a common operating means for said quadrants, sliding arm and recording mechanism.

9. An adding machine comprising a plurality of toothed wheels, type quadrants, a tensioned device for locking the quadrants to the wheels when the tension is released, a total lever, and means for releasing the tension upon said device when said lever is operated.

10. An adding machine comprising a plurality of key quadrants for setting the items, a plurality of type quadrants, a shiftable cipher-carrying element connected to each of the type quadrants and shiftable independently of the type quadrants, a connection between the type quadrants and the key quadrants for operating the type quadrants when the key quadrants are operated, means for shifting the cipher-carrying elements independently of the type quadrants, and operating means for the means for operating the cipher-carrying elements.

11. An adding machine comprising a plurality of key quadrants for setting the items, a plurality of type quadrants, a shiftable cipher-carrying element connected to each of the key quadrants and shiftable independently of the type quadrants, a connection between the type quadrants and the key quadrants when the key quadrants are operated, means for shifting the cipher-carrying elements independently of the type quadrants, operating means for the means for operating the cipher-carrying elements, and a recording mechanism associating with the type quadrants.

12. An adding machine comprising a plurality of key quadrants for setting the items, a plurality of type quadrants, a shiftable cipher-carrying element connected to each of the type quadrants and shiftable independently of the type quadrants, a connection between the type quadrants and the key quadrants for operating the type quadrants when the key quadrants are operated, a plurality of toothed wheels, means for shifting the cipher-carrying elements independently of the type quadrants, operating means for the means for operating the cipher-carrying elements, a recording mechanism associating with the type quadrants and means for carrying forward figures when a wheel passes a ninth tooth from a zero point.

13. An adding machine comprising a plurality of key quadrants for setting the items, a plurality of type quadrants, a shiftable cipher-carrying element connected to each of the type quadrants, a connection between the type quadrants and the key quadrants for operating the type mechanism when the key quadrants are operated, a plurality of toothed wheels, means for shifting the cipher-carrying elements independently of the type quadrants, operating means for the means of operating the cipher carrying elements, a recording mechanism associating with the type quadrants, means for carrying forward figures when a wheel passes a ninth tooth from a zero point, a total lever, a tension-releasing means operated by said lever, and a clearing lever.

14. In an adding machine, in combination, a plurality of key quadrants; a plurality of type quadrants connected with the key quadrants; accumulating wheels and carrying cams associated with the quadrants; and a shaft on which the quadrants, the accumulating wheels, and the carrying cams are mounted side by side; as set forth.

15. In an adding machine, in combination, a plurality of connected key and type quadrants, each key quadrant being connected to a type quadrant; a shaft about which the connected quadrants are adjustable; accumulating wheels loosely mounted on the same shaft, each accumulating wheel being associated with a connected pair of key and type quadrants to move in unison therewith in one direction; carrying cams mounted on the same shaft, each carrying cam being connected with an accumulating wheel to move in unison therewith; and means controlled by the carrying cams for carrying from one accumulating wheel to the next in order; as set forth.

16. In an adding machine, in combination, a shaft; a plurality of collars loosely mounted on the shaft; a connected pair of key and type quadrants on each collar; accumulating wheels mounted on the collars and operatively connected with the respective key and type quadrants; carrying cams mounted on the collars and connected with the respective accumulating wheels to move in unison therewith; and means controlled by the carrying cams for carrying from one accumulating wheel to the next in order; as set forth.

17. In an adding machine, in combination, a plurality of connected key and type quadrants; a plurality of toothed accumulating wheels; a plurality of carrying cams; collars on which the quadrants, wheels and cams are mounted in groups, each group comprising key and type quadrants, an accumulating wheel, and a carrying cam; and a shaft on which the collars are mounted; as set forth.

ANDREW RAWSON JENNINGS.

Witnesses:
S. S. DUNHAM,
THOMAS J. BYRNES.